United States Patent
Huang et al.

(10) Patent No.: US 11,703,964 B2
(45) Date of Patent: Jul. 18, 2023

(54) SWITCH AND OPERATING METHOD THEREOF

(71) Applicant: ATEN INTERNATIONAL CO., LTD., New Taipei (TW)

(72) Inventors: Yan-Chan Huang, New Taipei (TW); Yen-Yang Hsieh, New Taipei (TW)

(73) Assignee: ATEN INTERNATIONAL CO., LTD., New Taipei (TW)

( * ) Notice: Subject to any disclaimer, the term of this patent is extended or adjusted under 35 U.S.C. 154(b) by 0 days.

(21) Appl. No.: 17/351,198

(22) Filed: Jun. 17, 2021

(65) Prior Publication Data

US 2022/0004265 A1  Jan. 6, 2022

(30) Foreign Application Priority Data

Jul. 3, 2020 (TW) .................................. 109122601

(51) Int. Cl.
*G06F 3/038* (2013.01)
*G09G 3/20* (2006.01)
*G06F 3/14* (2006.01)

(52) U.S. Cl.
CPC ................ *G06F 3/038* (2013.01); *G06F 3/14* (2013.01); *G09G 3/2096* (2013.01); *G09G 2370/042* (2013.01); *G09G 2370/24* (2013.01)

(58) Field of Classification Search
CPC .................................................. G09G 2370/24
See application file for complete search history.

(56) References Cited

U.S. PATENT DOCUMENTS

2013/0169774 A1\* 7/2013 Ozawa ................. H04N 1/2166
   348/65
2019/0073176 A1\* 3/2019 Holland .................... G06F 3/14

FOREIGN PATENT DOCUMENTS

| TW | 200834376 A | 8/2008 |
| TW | M567898 U | 10/2018 |
| TW | M570459 U | 11/2018 |

\* cited by examiner

*Primary Examiner* — Gustavo Polo
(74) *Attorney, Agent, or Firm* — CKC & Partners Co., LLC

(57) ABSTRACT

The present disclosure provides a switch, which includes a first input port, a second input port, an output port and a control circuit. The output port outputs image data received by the first input port. The control circuit receives a first electrical characteristic and a second electrical characteristic from the first input port and the second input port respectively, and changes a third electrical characteristic of the output port when the second electrical characteristic is different from the first electrical characteristic, and then the output port outputs image data received by the second input port.

6 Claims, 2 Drawing Sheets

SWITCH AND OPERATING METHOD THEREOF

RELATED APPLICATIONS

This application claims priority to Taiwan Patent Application No. 109122601, filed Jul. 3, 2020, the entirety of which is herein incorporated by reference.

BACKGROUND

Field of Invention

The present invention relates to apparatuses and methods, and more particularly, switches and operating methods thereof.

Description of Related Art

A traditional KVM switch is a hardware device that allows users to control multiple computers. Although there are multiple computers connected to a KVM switch, the user can only control a single one of the multiple computers at the same time.

However, as to switching operation of an extended screen or a dual view, the user needs to manually reset the screen content, which is very inconvenient.

SUMMARY

In one or more various aspects, the present disclosure is directed to switches and operating methods thereof.

An embodiment of the present disclosure is related to a switch. The switch includes a first input port, a second input port, an output port and a control circuit. The output port outputs image data received from the first input port. The control circuit receives a first electrical characteristic and a second electrical characteristic from the first input port and the second input port respectively. When the second electrical characteristic is different from the first electrical characteristic, the control circuit changes a third electrical characteristic of the output port, and then the output port outputs image data received from the second input port.

In one embodiment of the present disclosure, when the output port is electrically connected to an image output device, the control circuit receives a fourth electrical characteristic of the image output device through the output port.

In one embodiment of the present disclosure, the switch further includes a hot plug detection pin. The hot plug detection pin is electrically connected to the output port. After receiving the fourth electrical characteristic, the control circuit maintains a logic high level of the hot plug detection pin.

In one embodiment of the present disclosure, during a state of the logic high level of the hot plug detection pin is maintained, while the first input port is electrically connected to a first host, the control circuit receives the first electrical characteristic from the first input port and sets the third electrical characteristic of the output port based on the first electrical characteristic, so that the first electrical characteristic is updated to the image output device.

In one embodiment of the present disclosure, while the second input port is electrically connected to a second host, the control circuit receives the second electrical characteristic from the second input port. When the control circuit detects that an input port is switched from the first input port to the second input port, the control circuit determines whether the second electrical characteristic is different from the first electrical characteristic. When the second electrical characteristic is different from the first electrical characteristic, the control circuit changes the third electrical characteristic of the output port based on the second electrical characteristic, so that the second electrical characteristic is updated to the image output device.

Another embodiment of the present disclosure is related to an operation method of a switch. The switch includes a first input port, a second input port and an output port. The operation method includes steps of: using the output port to output image data received from the first input port; receiving a first electrical characteristic and a second electrical characteristic from the first input port and the second input port respectively, when the second electrical characteristic is different from the first electrical characteristic, changing a third electrical characteristic of the output port, and then using the output port to output image data received from the second input port.

In one embodiment of the present disclosure, the operation method further includes steps of: when the output port is electrically connected to an image output device, receiving a fourth electrical characteristic of the image output device through the output port.

In one embodiment of the present disclosure, the operation method further includes steps of: after receiving the fourth electrical characteristic, maintaining a logic high level of a hot plug detection pin, wherein the hot plug detection pin is electrically connected to the output port.

In one embodiment of the present disclosure, during a state of the logic high level of the hot plug detection pin is maintained, while the first input port is electrically connected to a first host, receiving the first electrical characteristic from the first input port, and setting the third electrical characteristic of the output port based on the first electrical characteristic, so that the first electrical characteristic is updated to the image output device.

In one embodiment of the present disclosure, while the second input port is electrically connected to a second host, receiving the second electrical characteristic from the second input port; when detecting that an input port is switched from the first input port to the second input port, determining whether the second electrical characteristic is different from the first electrical characteristic; when the second electrical characteristic is different from the first electrical characteristic, changing the third electrical characteristic of the output port based on the second electrical characteristic, so that the second electrical characteristic is updated to the image output device.

Technical advantages are generally achieved, by embodiments of the present disclosure. With the technical solution of the present disclosure, there is no need for the user to manually reset the screen content, and there is no need to add an extra expensive device for image conversion.

Many of the attendant features will be more readily appreciated, as the same becomes better understood by reference to the following detailed description considered in connection with the accompanying drawings.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
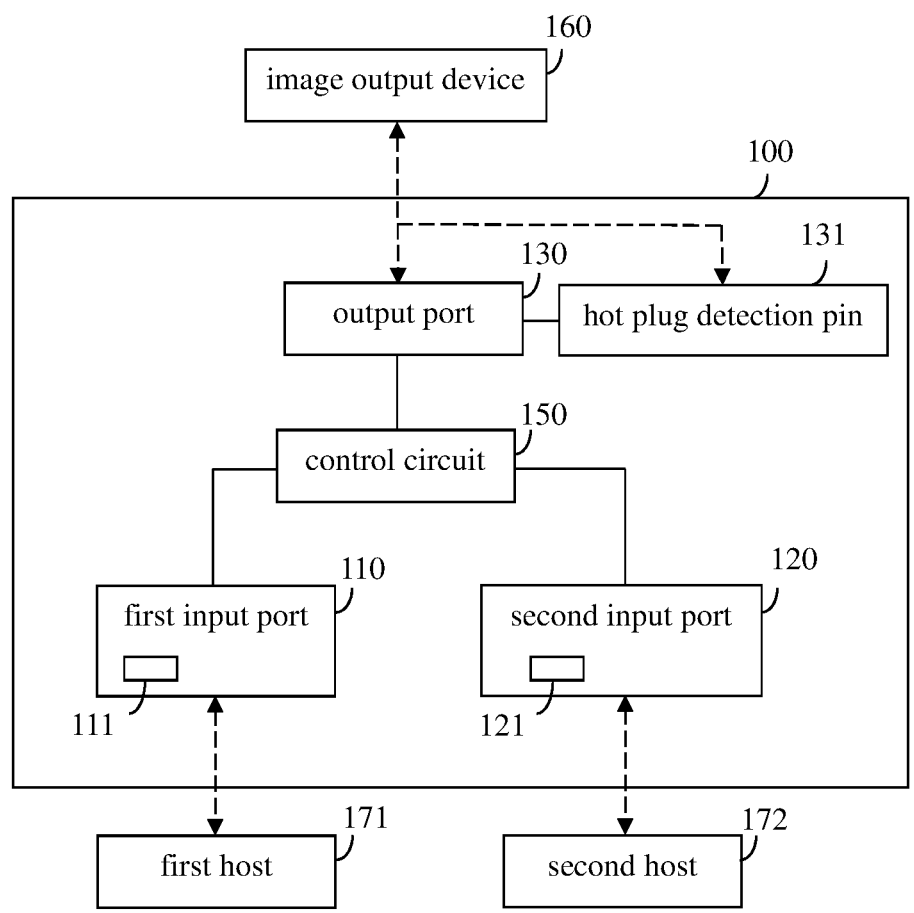
FIG. 1 is a block diagram of a switch according to one embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

As used in the description herein and throughout the claims that follow, the meaning of "a", "an", and "the" includes reference to the plural unless the context clearly dictates otherwise. Also, as used in the description herein and throughout the claims that follow, the terms "comprise or comprising", "include or including", "have or having", "contain or containing" and the like are to be understood to be open-ended, i.e., to mean including but not limited to. As used in the description herein and throughout the claims that follow, the meaning of "in" includes "in" and "on" unless the context clearly dictates otherwise.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram of a switch 100 according to one embodiment of the present disclosure. As shown in FIG. 1, the switch 100 includes a first input port 110, a second input port 120, an output port 130, a hot plug detection (HPD) pin 131 and a control circuit 150. For example, the switch 100 can be a KVM switch or another switching apparatus, the first input port 110 and the second input port 120 can be input ports of a high definition multimedia interface (HDMI), the output port 130 can be an output port of the HDMI, and the control circuit 150 can be a built-in controller or another circuit.

In structure, the first input port 110, the second input port 120 and the output port 130 are electrically connected to the control circuit 150. The hot plug detection pin 131 is electrically connected to the output port 130. The first input port 110 has a first storage element 111, and the second input port 120 has a second storage element 121. The first and second storage elements 111, 121 can be built-in registers or memory circuits, such as DDC blocks.

In one embodiment of the present disclosure, the output port 130 outputs image data received from the first input port 110. The control circuit 150 receives a first electrical characteristic and a second electrical characteristic from the first input port 110 and the second input port 120 respectively. When the second electrical characteristic is different from the first electrical characteristic, the control circuit 150 changes a third electrical characteristic of the output port 130, and then the output port 130 outputs image data received from the second input port 120. In this way, there is no need for the user to manually reset the screen content, and there is no need to add an extra expensive device for image conversion.

Specifically, when the first input port 110 is electrically connected to the first host 171 (e.g., a computer host), the first input port 110 receives the first electrical characteristic provided by the first host 171. The first storage element 111 stores the first electrical characteristic. For example, the first electrical characteristic can be information of status and control data channel (SCDC) of the first host 171. Before the output port 130 outputs the image data of the first host 171 received from the first input port 110, the control circuit 150 sets the third electrical characteristic of the output port 130 based on the first electrical characteristic, so that the first electrical characteristic can be updated to the image output device 160. Accordingly, the image output device 160 can identify the first host 171.

Similarly, when the second input port 120 is electrically connected to the second host 172 (e.g., a computer host), the second input port 120 receives the second electrical characteristic provided by the second host 172. The second storage element 121 stores the second electrical characteristic. For example, the second electrical characteristic can be information of status and control data channel (SCDC) of the second host 172. Before the output port 130 outputs the image data of the second host 172 received from the second input port 120, while the second electrical characteristic is different from the first electrical characteristic, the control circuit 150 sets the third electrical characteristic of the output port 130 based on the second electrical characteristic, so that the second electrical characteristic can be updated to the image output device 160. Accordingly, the image output device 160 can identify the second host 172.

When the output port 130 is electrically connected to the image output device 160, such as a display, a projector or the like, the control circuit 150 receives the fourth electrical characteristic of the image output device 160 through the output port 130. For example, the fourth electrical characteristic can be extended display identification data (EDID) of the image output device 160. The first input port 110 and the second input port 120 receive the fourth electrical characteristic of the image output device 160 through the control circuit 150. The first storage element 111 and the second storage element 121 each store the fourth electrical characteristic. Thus, the first host 171 or the second host 172 provides the image data that meet the specifications of the image output device 160 according to the fourth electrical characteristic.

For a more complete understanding of an automatic switching operation of the switch 100, refer to FIG. 1. After the control circuit 150 receives the fourth electrical characteristic of the image output device 160, the control circuit 150 maintains a logic high level (e.g., logic "1") of the hot plug detection pin 131. Therefore, the host determines that it is always connected to the image output device 160. In that way, if a user switches from the first host 171 to the second host 172, or from the second host 172 to the first host 171, the screen will not flash, so that the user's viewing comfort can be improved.

In one embodiment of the present disclosure, during a state of the logic high level of the hot plug detection pin 131 is maintained, while the first input port 110 is electrically connected to the first host 171, the control circuit 150 receives the first electrical characteristic from the first input port 110 and sets the third electrical characteristic of the output port 130 based on the first electrical characteristic, so that the first electrical characteristic is updated to the image output device 160. Accordingly, the image output device 160 can recognize the first host 171 as a currently connected host. The first host 171 provides the image data that meets the specifications of the image output device 160 according to the fourth electrical characteristic. The output port 130 outputs the image data of the first host 171 received from the first input port 110 to the image output device 160.

In one embodiment of the present disclosure, while the second input port 120 is electrically connected to the second host 172, the control circuit 150 receives the second electrical characteristic from the second input port 120. The user can use the switch 100 for switching operation, so that the control circuit 150 can get a corresponding switching instruction; accordingly, when the control circuit 150 detects that the input port is switched from the first input port 110 to the second input port 120, the control circuit 150 determines whether the second electrical characteristic is different from the first electrical characteristic.

When the second electrical characteristic is different from the first electrical characteristic, it means that the first and second hosts 171 and 172 are two hosts of different specifications for the image output device 160, and therefore the control circuit 150 changes the third electrical characteristic of the output port 130 based on the second electrical characteristic, so that the second electrical characteristic is updated to the image output device 160. Accordingly, the image output device 160 can recognize that the currently connected host is switched to the second host 172. The second host 172 provides the image data that meets the specifications of the image output device 160 according to the fourth electrical characteristic. The output port 130 outputs the image data of the second host 172 received from the second input port 120 to the image output device 160.

Otherwise, when the second electrical characteristic is equal to the first electrical characteristic, it means that the first and second hosts 171 and 172 belong to the same specification host for the image output device 160, and therefore the control circuit 150 outputs the image data received from the second input port 120 through the output port 130, without changing the third electrical characteristic of the output port 130.

Figure 2:
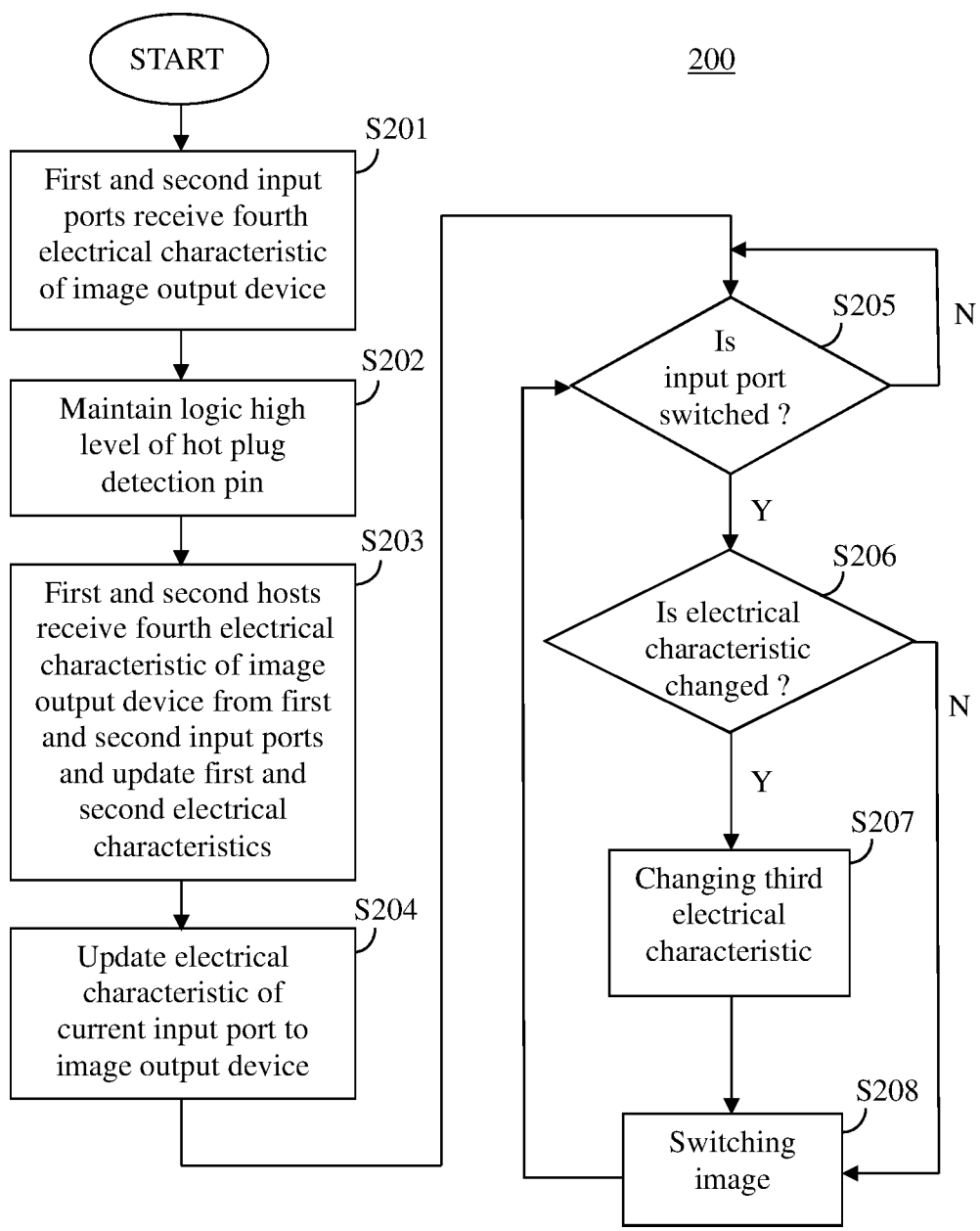
FIG. 2 is a flow chart of an operation method of the switch according to one embodiment of the present disclosure.

For a more complete understanding of an operating method of the switch 100, referring FIGS. 1-2, FIG. 2 is a flow chart of the operation method 200 of the switch 100 according to one embodiment of the present disclosure. As shown in FIG. 2, the operation method 200 includes steps S201-S208. However, as could be appreciated by persons having ordinary skill in the art, for the steps described in the present embodiment, the sequence in which these steps is performed, unless explicitly stated otherwise, can be altered depending on actual needs; in certain cases, all or some of these steps can be performed concurrently.

In step S201, when the output port 130 is electrically connected to the image output device 160, the first input port 110 and the second input port 120 receive the fourth electrical characteristic of the image output device 160. The first storage element 111 and the second storage element 121 each store the fourth electrical characteristic previously.

In step S202, the logic high level of the hot plug detection pin 131 is maintained. Therefore, the host determines that it is always connected to the image output device 160. In that way, if a user switches from the first host 171 to the second host 172, or from the second host 172 to the first host 171, the screen will not flash, so that the user's viewing comfort can be improved.

In step S203, while the first input port 110 is electrically connected to the first host 171, the first host 171 receives the pre-stored fourth electrical characteristic of the image output device 160 from the first input port 110, and the first electrical characteristic of the first host 171 is updated to the first input port 110, so that the first storage element 111 can store the updated first electrical characteristic. Similarly, while the second input port 120 is electrically connected to the second host 172, the second host 172 receives the pre-stored fourth electrical characteristic of the image output device 160 from the second input port 120, and the second electrical characteristic of the second host 172 is updated to the second input port 120 so that the second storage element 121 can store the updated second electrical characteristic.

In step S204, for example, a currently control host is the first host 171, the third electrical characteristic of the output port 130 is set based on the first electrical characteristic, so that the first electrical characteristic is updated to the image output device 160. Accordingly, the image output device 160 can recognize the first host 171 as the currently control host. The first host 171 provides the image data that meets the specifications of the image output device 160 according to the fourth electrical characteristic. The output port 130 outputs the image data of the first host 171 received from the first input port 110 to the image output device 160.

In step S205, detecting whether the input port is switched. For example, the user can use the switch 100 for switching operation, so that the switch 100 can generate a corresponding switching instruction; accordingly, it is confirmed that the input port is switched from the first input port 110 to the second input port 120. While no switching instruction is generated, the detecting manner of step S205 is performed repeatedly.

When detecting that the input port is switched from the first input port 110 to the second input port 120, in step S206, it is determined whether the electrical characteristic is changed. In other word, it is determined whether the second electrical characteristic pre-stored in the second storage element 121 is different from the first electrical characteristic pre-stored in the first storage element 111.

When the second electrical characteristic is different from the first electrical characteristic, it means that the first and second hosts 171 and 172 are two hosts of different specifications for the image output device 160, and therefore in step S207, the third electrical characteristic of the output port 130 is changed based on the second electrical characteristic, so that the second electrical characteristic is updated to the image output device 160. Accordingly, the image output device 160 can recognize that the currently control host is switched to the second host 172. The second host 172 provides the image data that meets the specifications of the image output device 160 according to the fourth electrical characteristic. In step S208, switching the image; the output port 130 outputs the image data of the second host 172 received from the second input port 120 to the image output device 160.

When the second electrical characteristic is equal to the first electrical characteristic, it means that the first and second hosts 171 and 172 belong to the same specification host for the image output device 160, and In step S208, switching the image; the image data received from the second input port 120 is outputted through the output port 130, without changing the third electrical characteristic of the output port 130.

It should be understood that the functions performed by each element in the switch 100 can be incorporated into the steps of the operating method 200. Since the above embodiments have specifically disclosed the function of each element, it will not be repeated here.

Technical advantages are generally achieved, by embodiments of the present disclosure. With the technical solution of the present disclosure, there is no need for the user to manually reset the screen content, and there is no need to add an extra expensive device for image conversion.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A switch, comprising:
a first input port;
a second input port;
an output port configured to output image data received from the first input port; and
a control circuit configured to receive a first electrical characteristic and a second electrical characteristic from the first input port and the second input port respectively, when the second electrical characteristic is different from the first electrical characteristic, the control circuit configured to change a third electrical characteristic of the output port, and then the output port configured to output image data received from the second input port,
wherein when the output port is electrically connected to an image output device, the control circuit receives a fourth electrical characteristic of the image output device through the output port,
wherein the switch further comprises a hot plug detection pin electrically connected to the output port, and after receiving the fourth electrical characteristic, the control circuit is configured to maintain a logic high level of the hot plug detection pin.

2. The switch of claim 1, wherein during a state of the logic high level of the hot plug detection pin is maintained, while the first input port is electrically connected to a first host, the control circuit receives the first electrical characteristic from the first input port and sets the third electrical characteristic of the output port based on the first electrical characteristic, so that the first electrical characteristic is updated to the image output device.

3. The switch of claim 2, wherein while the second input port is electrically connected to a second host, the control circuit receives the second electrical characteristic from the second input port, when the control circuit detects that an input port is switched from the first input port to the second input port, the control circuit determines whether the second electrical characteristic is different from the first electrical characteristic, and when the second electrical characteristic is different from the first electrical characteristic, the control circuit changes the third electrical characteristic of the output port based on the second electrical characteristic, so that the second electrical characteristic is updated to the image output device.

4. An operating method of a switch, the switch comprising a first input port, a second input port and an output port, and the operating method comprising:
using the output port to output image data received from the first input port;
receiving a first electrical characteristic and a second electrical characteristic from the first input port and the second input port respectively, when the second electrical characteristic is different from the first electrical characteristic, changing a third electrical characteristic of the output port, and then using the output port to output image data received from the second input port;
when the output port is electrically connected to an image output device, receiving a fourth electrical characteristic of the image output device through the output port and
after receiving the fourth electrical characteristic, maintaining a logic high level of a hot plug detection pin, wherein the hot plug detection pin is electrically connected to the output port.

5. The operating method of claim 4, further comprising:
during a state of the logic high level of the hot plug detection pin is maintained, while the first input port is electrically connected to a first host, receiving the first electrical characteristic from the first input port, and setting the third electrical characteristic of the output port based on the first electrical characteristic, so that the first electrical characteristic is updated to the image output device.

6. The operating method of claim 5, further comprising:
while the second input port is electrically connected to a second host, receiving the second electrical characteristic from the second input port;
when detecting that an input port is switched from the first input port to the second input port, determining whether the second electrical characteristic is different from the first electrical characteristic; and
when the second electrical characteristic is different from the first electrical characteristic, changing the third electrical characteristic of the output port based on the second electrical characteristic, so that the second electrical characteristic is updated to the image output device.

* * * * *